(12) United States Patent
Spare

(10) Patent No.: US 7,855,022 B2
(45) Date of Patent: Dec. 21, 2010

(54) FUEL SYSTEM WITH IMPROVED FUEL CELL SHUTDOWN

(75) Inventor: Bradley Landon Spare, Oceanside, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1056 days.

(21) Appl. No.: 11/565,146

(22) Filed: Nov. 30, 2006

(65) Prior Publication Data

US 2007/0122664 A1    May 31, 2007

Related U.S. Application Data

(60) Provisional application No. 60/740,756, filed on Nov. 30, 2005.

(51) Int. Cl.
*H01M 8/04* (2006.01)

(52) U.S. Cl. .................. 429/429; 429/444; 429/512

(58) Field of Classification Search .................. None
See application file for complete search history.

(56) References Cited

U.S. PATENT DOCUMENTS

| | | |
|---|---|---|
| 6,514,635 B2 | 2/2003 | Van Dine et al. |
| 6,656,617 B2 | 12/2003 | Aoyama et al. |
| 6,864,003 B2 | 3/2005 | Ueda et al. |
| 6,887,599 B2 | 5/2005 | Reiser et al. |
| 6,939,636 B2 | 9/2005 | Fuglevand et al. |
| 2004/0131912 A1 | 7/2004 | Keefer et al. |
| 2005/0031922 A1 | 2/2005 | Clingerman et al. |
| 2005/0064258 A1 | 3/2005 | Fredette |
| 2005/0106424 A1 | 5/2005 | Elhamid et al. |
| 2005/0106429 A1 | 5/2005 | Keefer |
| 2005/0136304 A1 | 6/2005 | Pettit et al. |
| 2005/0147855 A1 | 7/2005 | Reiser et al. |
| 2005/0158601 A1 | 7/2005 | Skala |
| 2005/0221148 A1 | 10/2005 | Goebel |
| 2005/0255346 A1 | 11/2005 | Ueda et al. |
| 2006/0008689 A1 | 1/2006 | Yonekura et al. |
| 2006/0040150 A1 | 2/2006 | Yu et al. |
| 2006/0040158 A1 | 2/2006 | Numata et al. |
| 2006/0046106 A1 | 3/2006 | Yu et al. |
| 2006/0051629 A1 | 3/2006 | Limbeck et al. |
| 2007/0122664 A1* | 5/2007 | Spare .................. 429/13 |

\* cited by examiner

*Primary Examiner*—John S Maples
(74) *Attorney, Agent, or Firm*—Gifford, Krass, Sprinkle, Anderson & Citkowski, P.C.

(57) ABSTRACT

A fuel cell system having a fuel cell with an anode and a cathode wherein both the cathode and anode each have a flow path with an inflow and outflow. A gaseous source containing oxygen is connected to the inflow of the cathode flow path while a gaseous fuel source is connected to the inflow of the anode flow path. Upon shutdown of the fuel cell, a control system reduces the stoichiometric ratio at the anode to less than or equal to one to thereby deplete the oxygen from the gas at the cathode. A normally closed valve is fluidly connected between the cathode outflow and the anode inflow. The control system opens the valve upon shutdown of the fuel cell to thereby purge the fuel from the anode flow path with the oxygen depleted outflow from the cathode flow path.

8 Claims, 1 Drawing Sheet

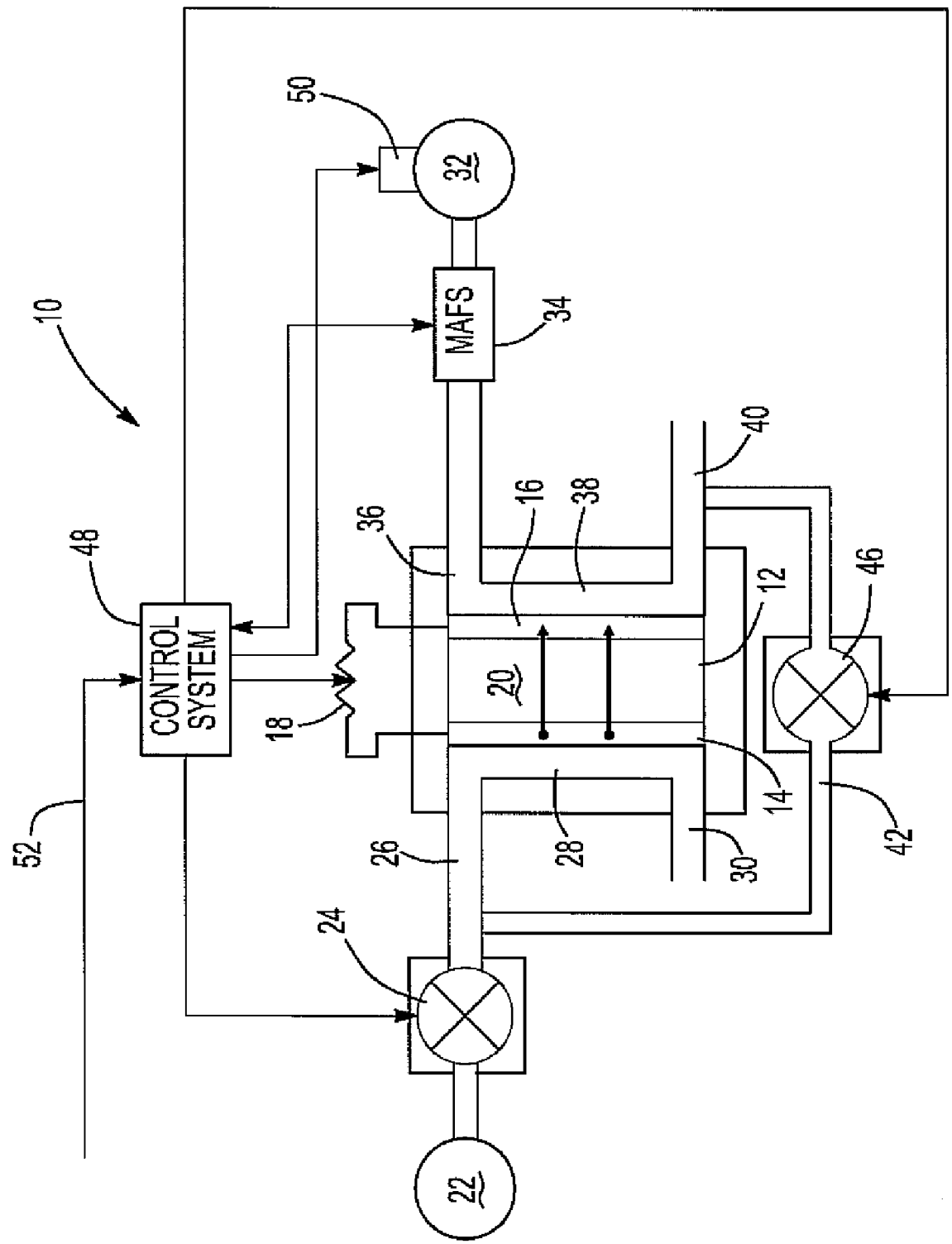

FUEL SYSTEM WITH IMPROVED FUEL CELL SHUTDOWN

CROSS-REFERENCE TO RELATED APPLICATIONS

This application claims priority of U.S. Provisional Patent Application Ser. No. 60/740,756 filed Nov. 30, 2005, which is incorporated herein by reference.

BACKGROUND OF THE INVENTION

I. Field of the Invention

The present invention relates generally to fuel cells and, more particularly, to a fuel cell with an improved fuel cell shutdown.

II. Description of Related Art

Although different types of electrical energy storage devices may be utilized for powering electric motor vehicles, there has been an increased interest in the use of fuel cells to provide the electric power for such electric vehicles. Such fuel cells contain both a cathode and an anode, each of which has a gaseous flow path. A gaseous fuel, such as hydrogen, is coupled to the flow path of the anode while a reactant gas, such as air containing oxygen, flows through the cathode flow path. An electrolyte is positioned in between the anode and cathode flow paths while the anode and cathode are connected to an electrical load, such as a battery.

In operation, the hydrogen flow through the anode flow path disassociates the hydrogen into protons and electrons. The protons conduct through an electrolytic membrane directly to the cathode while the electrons travel through the electric load. At the cathode, the oxygen molecules combine with the disassociated hydrogen to form water. Consequently, the exhaust or outflow from the cathode flow path comprises primarily nitrogen and water vapor.

In the previously known fuel cells, in order to shut down the fuel cell, the supply of oxygen and air to the fuel cell anode and cathode flow path was terminated. While termination of both the hydrogen and oxygen to the fuel cell terminates the production of electrical power from the fuel cell, an electrical charge remains on the fuel cell membrane. Over time the charge on the fuel cell membrane following fuel cell shutdown may result in degradation of the fuel cell.

One way to prevent degradation of the fuel cell from the charge remaining on the fuel cell membrane following shutdown is to blow out or purge the anode flow path during the fuel cell shutdown. A bottle of compressed helium or compressed nitrogen may be selectively fluidly connected to the anode flow path in order to purge the flow path. The use of such stored nitrogen or helium, however, is disadvantageous where the fuel cell is used in a motor vehicle since the purged gas must be replenished periodically.

SUMMARY OF THE PRESENT INVENTION

The present invention provides a fuel cell with improved shutdown which overcomes the above-mentioned disadvantages of the previously known fuel cell systems.

In brief, the fuel cell system of the present invention comprises an anode and a cathode each having a flow path with an inflow and outflow. A gas source, such as air, containing oxygen is connected to the inflow of the cathode flow path. Similarly, a gaseous fuel source, e.g. compressed hydrogen, is connected to the inflow of the anode flow path. An electrical load is then connected in series with the anode and cathode.

In a conventional fashion, an electrolyte is positioned in between the anode and cathode. This electrolyte generally comprises a proton conducting polymer membrane which conducts protons from the anode to the cathode, but not electrons. An electrical load connected in series between the anode and cathode thus receives the electron current flow between the anode and cathode.

In operation, hydrogen is flowed through the anode flow path where the hydrogen disassociates into protons and electrons. The electrolyte conducts the protons to the cathode while the electrons are flowed through the electrical load.

Simultaneously, oxygen, such as air containing oxygen, is flowed through the cathode flow path. The hydrogen protons passing through the electrolyte combine with the oxygen to form water so that water and nitrogen are exhausted from the cathode flow path. Furthermore, since the cathode is maintained at a stoichiometric ratio of greater than one during normal operation of the fuel cell in order to ensure adequate oxygen within the cathode flow path, the exhaust or outflow from the cathode flow path also contains oxygen.

During a fuel cell shutdown, a control system changes the stoichiometric ratio at the cathode to less than or equal to one. This may be done in several ways, such as by increasing the electric load, decreasing the airflow through the cathode flow path, etc. Upon reduction of the stoichiometric ratio to less than one, the outflow or exhaust from the cathode flow path is depleted of oxygen.

At the same time, the control system closes the valve which supplies the hydrogen fuel to the anode. The control system also opens a valve that fluidly connects the outflow from the cathode flow path to the inflow of the anode flow path. In doing so, the now oxygen depleted gaseous flow from the cathode flow path passes through the anode flow path thus purging the anode of fuel. Thus, the charge contained on the electrolyte is effectively reduced to zero or near zero.

BRIEF DESCRIPTION OF THE DRAWING

A better understanding of the present invention will be had upon reference to the following description when read in conjunction with the accompanying drawing which is a block diagrammatic view of a preferred embodiment of the present invention.

DETAILED DESCRIPTION OF A PREFERRED EMBODIMENT OF THE PRESENT INVENTION

With reference to the drawing, a preferred embodiment of a fuel cell system 10 according to the present invention is shown and includes a fuel cell 12. The fuel cell 12 includes an anode 14 and a cathode 16. An electrical load 18 is connected in series between the anode 14 and cathode 16. The load 18 may comprise, for example, a battery, electric motor for an electric vehicle or other electrical system.

An electrolyte 20 is sandwiched in between the anode 14 and cathode 16. The electrolyte 20 comprises a proton conducting polymer membrane which separates the anode 14 from the cathode 16. Furthermore, although only a single anode 14, single cathode 16 and single electrolyte 20 is illustrated in the drawing, it will be understood that in a typical application the overall fuel cell 12 includes a plurality of layers in order to obtain the desired voltage output from the fuel cell 12.

A fuel source 22, such as a source of compressed hydrogen, is connected through a valve 24 to the inflow 26 of an anode flow passageway 28. The anode passageway 28 further includes an outflow 30.

A source 32, such as an air compressor, of reactant gas containing oxygen is fluidly coupled through a mass airflow sensor 34 to the inflow 36 of a cathode flow passageway 38. The flow passageway 38 further includes an outflow 40.

A purge passageway 42 fluidly connects the outflow 40 of the cathode passageway 38 with the inflow 26 of the anode passageway 28. An anode dilution valve 46 is connected in series with the purge passageway 42.

A mechanism 50 is also provided to control the supply of oxygen to the cathode passageway 38. This mechanism 50 may comprise, for example, a speed control for a compressor which forms the oxygen source 32. Consequently the supply of gas, and thus the supply of oxygen, to the cathode passageway 38 may be controlled by controlling the compressor speed. Other mechanisms 50, however, for controlling the supply of oxygen to the cathode may alternatively be used.

In order to control the operation of the fuel cell system 10, a control system 48 is provided and is electrically connected to the fuel supply valve 24 as well as the valve 46. The control system 48 thus controls the actuation, i.e. opening and closing, of these valves 24 and 46.

The control system 48 also controls the operation of the oxygen supply control mechanism 50. Thus, by controlling the flow mechanism 50, the amount of oxygen supplied to the cathode flow passageway 38 may be varied under control of the control system 48.

The control system 48 optionally controls the operation of the electrical load 18. Thus, the control system 48 selectively and optionally controls the amount of current draw by the load 18 from the fuel cell 12.

The control system 48 receives input signals which determine the output signals for the control system 48. For example, the control system 48 preferably includes an input signal from the mass airflow sensor 34 indicative of the amount of oxygen provided to the cathode passageway 38. Similarly, the control system 48 receives a signal on input line 52 of the desired shutdown of the fuel cell 12.

During normal operation, the control system 48 maintains the fuel supply valve 24 in an open position and, simultaneously, the valve 46 in a closed position. In doing so, hydrogen from the source 22 flows into the anode passageway 28 and, simultaneously, oxygen from the source 32 flows into the cathode passageway 38.

The electrolyte 20 disassociates the hydrogen atoms into protons and electrons. The protons flow through the electrolyte into the cathode 16. The electrons, however, cannot flow through the electrolyte 20 and instead flow from the anode 14, through the electrical load 18 and to the cathode 16.

Once the protons reach the cathode 16, the protons react with the oxygen from the source 32 to form water vapor. This water vapor is then expelled out through the outflow 40 of the cathode flow passage 38.

During the normal operation of the fuel cell 12, i.e. when the fuel cell is operated to extract electrical power from the fuel source 22, the oxygen is maintained in the cathode passageway 38 at a stoichiometric ratio greater than or equal to one to ensure that sufficient oxygen is always present within the cathode flow passageway. This, in turn, results in the most efficient operation of the fuel cell 12.

Conversely, upon receipt of a fuel cell shutdown signal on line 52, the control system 48 immediately decreases the stoichiometric ratio in the cathode passageway 38 to less than or equal to one. This may be done in any of several fashions.

For example, in order to reduce the stoichiometric ratio to less than or equal to one, the control signal may generate a signal to the oxygen control mechanism 50 to reduce the supply of oxygen to the cathode flow passageway 38. By reducing the amount of oxygen within the flow passageway 38, the protons from the disassociated hydrogen will combine with all of the oxygen to ensure that the gas flow through the outflow 40 of the cathode passageway 38 is depleted of oxygen.

Alternatively or in addition to control of the oxygen supply mechanism 50, the control system 48 generates a control signal to the electrical load 18 which effectively increases the electrical resistance between the anode 14 and cathode 16. This in turn results in increased current flow from the anode 14 to the cathode 16 which thus results in greater disassociated hydrogen protons in the cathode passageway 38, again depleting the oxygen in the outflow 40 from the cathode passageway 38.

Simultaneous with or immediately after reducing the stoichiometric ratio in the cathode flow passageway 38 to less than or equal to one, the control system 48 opens the purge valve 46 and simultaneously closes the fuel supply valve 24. Consequently, the oxygen depleted gases from the cathode flow passageway outflow 40, principally nitrogen with some water vapor, flow through the purge passageway 42 and then through the anode flow passageway 28 thus purging the anode flow passageway 28 of hydrogen. By doing so, the electrical charge within the fuel cell 12 is reduced to zero or near zero.

From the foregoing, it can be seen that the present invention provides a simple and yet effective system for purging the anode flow passageway of a fuel cell upon fuel cell shutdown. Having described my invention, however, many modifications thereto will become apparent to those skilled in the art to which it pertains with deviation from the spirit of the invention as defined by the scope of the appended claims.

I claim:

1. A fuel cell system comprising:
  a fuel cell having an anode and a cathode, said cathode and said anode each having a flow path with an inflow and an outflow,
  a gas source containing oxygen connected to said inflow of said cathode flow path,
  a gas fuel source connected to said inflow of said anode flow path,
  a control circuit operable upon shutdown of the fuel cell which increases the electrical load electrically connected between the anode and cathode by an amount sufficient to reduce the stoichiometric ratio of the oxygen to the fuel at the cathode to not more than one,
  said control circuit thereafter operating a purge valve to flow the oxygen depleted cathode exhaust through the anode flow path.

2. The fuel cell as defined in claim 1 wherein said means for reducing the stoichiometric ratio comprises means for reducing gas flow through said cathode flow path.

3. The fuel cell as defined in claim 1 wherein said means for reducing the stoichiometric ratio comprises means for increasing the current load on the fuel cell.

4. The fuel cell as defined in claim 1 and comprising means for terminating gas fuel flow to said anode flow path upon fuel cell shutdown.

5. The fuel cell as defined in claim 4 wherein said means for terminating gas fuel flow to said anode flow path comprises a gas valve.

6. A method for shutting down a fuel cell of the type having an anode with an anode flow path connected to a source of fuel, a cathode with a cathode flow path connected to a gas source containing oxygen comprising the steps of:
  reducing the stoichiometric ratio of the oxygen to the fuel at the cathode to less than or equal to one by increasing the electric load electrically connected between the anode and cathode to thereby deplete oxygen from a gas outflow from the cathode, terminating gas fuel flow to the anode, and fluidly connecting the oxygen depleted airflow from the cathode to the anode flow path to thereby purge the anode of fuel.

7. The method as defined in claim 6 wherein said reducing step comprises the step of reducing gas flow to the cathode flow path.

8. The method as defined in claim 6 wherein said reducing step comprises the step of increasing the electrical load on the fuel cell.

* * * * *